United States Patent Office 3,242,011
Patented Mar. 22, 1966

3,242,011
METHOD OF MAKING FUEL CELL ELECTRODES
Romeo R. Witherspoon, Anderson, Ind., assignor to Union Carbide Corporation, a corporation of New York
No Drawing. Filed Nov. 1, 1962, Ser. No. 234,857
4 Claims. (Cl. 136—120)

This application is a continuation-in-part of copending application Serial No. 81,960, filed January 11, 1961, and now abandoned.

The invention relates to improved electrodes for use in fuel cells for the direct conversion of chemical energy into electrical energy. More specifically, the invention relates to an improved electrode for a fuel cell and to a process for making the same.

It has been proposed in the prior art to use porous nickel electrodes, prepared by various processes, in fuel cells. The porous nickel electrodes previously suggested, however, were found to be very easily wetted and "drowned" by the cell electrolyte, thus having only a very limited life. A further disadvantage possessed by such electrodes is that they did not produce a satisfactory current density until a temperature of about 230° C. was reached at a pressure of about 600 to 800 pounds per square inch.

The main object of the invention is, therefore, to provide a gas permeable fuel cell electrode which is relatively resistant to electrolyte penetration. Another object is to provide a porous nickel electrode capable of producing a high current density at a relatively low temperature.

Broadly, the invention achieves these objects by providing a fuel cell electrode comprising a gas permeable body having on its active face a surface coating consisting of finely dispersed particles of an electrolyte-repellent material having a molecular weight in excess of 10,000 and a softening point at least about 10° C. above the temperature of the operating environment of the electrode, i.e., the operating temperature of a cell containing the electrode. The gas permeable body may be made of any suitable material or materials, such as nickel, silver, carbon, graphite, activated carbon, or mixtures thereof, but nickel plaques of any desired shape having a porosity in the range of 20 to 80 percent are preferred. It will be apparent to those in the art that, in general, the effectiveness of the gas permeable bodies as electrodes may be improved by depositing catalysts on the active surfaces of the bodies, but this is not mandatory in all cases. With respect to porous nickel electrodes, however, the following procedures of catalysis have been found to be very effective, especially in providing a nickel electrode capable of producing a high current density at a relatively low temperature.

Where the porous nickel plaques are to be made into hydrogen anodes, they are preferably treated with a slightly alkaline aqueous solution of a compound of a metal of the platinum family, namely, iridium, platinum, palladium, rhodium, ruthenium, or mixtures of the compounds of these metals, and thereafter heating in air at 180° to at least 300° C. in the presence of a suitable reducing agent, such as a hydrogen atmosphere, to deposit the metal therein and thereon in finely divided form. The catalyst concentration ranges from about 1.0 to 12 milligrams per square centimeter of apparent electrode area, but preferably is from about 5 to 10 milligrams per square centimeter. Catalyst concentrations necessary for carbon electrodes may be lower, and in general range between ¼ and 8 milligrams per square centimeter.

The porous nickel plaques are made into oxygen cathodes by applying thereto solutions of silver acetate dissolved in ammonia, or of nickel formate dissolved in ammonia, or by applying mixed silver and nickel solutions to the plaques. Solutions of gold salts may also be used. The treated electrode is then heated at a temperature below about 300° C. in the presence of a reducing agent for a time sufficient to form the catalyst in its highly active, finely divided form.

It is believed that the nickel salt, as used here, is not reduced to the metal, but instead forms finely divided nickel oxide on the electrode surface. Whatever be the form of the catalyst, it permits the electrode to be operated at higher current densities.

The temperature required to convert the instant catalysts to their highly active form ranges from 180° to at least 300° C. and depends on the reducing agent selected. The heating time usually ranges between 10 and 30 minutes.

In accordance with the invention, the electrodes are given a special electrolyte-repellency treatment in order to operate better. This treatment substantially prevents hydrostatic pressure from forcing electrolyte through the larger pore openings and insures an adequate three phase area (gas:electrode:liquid) under a wide variety of operating conditions. This treatment consists of immersing the electrode in a solution of from 2 to 10 grams of high molecular weight (e.g. 20,000) polyethylene in 100 ml. of toluene at 90° to 100° C. The electrodes are then rapidly removed from the solution and "quenched" by immersing them in a cool bath of low boiling (B.P. 30–60° C.) petroleum ether. They are then taken from the bath and dried to remove all traces of solvent. This may be done in vacua, if desired.

This "solvent quenching" technique takes advantage of the fact that polyethylene is soluble in a variety of aliphatic and aromatic solvents at higher temperatures in the range 80° to 100° C., but is substantially insoluble at lower temperatures of approximately 20° to 50° C. When such a solution is heated and then cooled, the polyethylene comes out in the form of very tiny, finely dispersed particles and not in a continuous film. It is believed that this is the reason why the electrolyte-repellent material does not form a continuous film which would block the electrode surface, but instead apparently gives a large, three phase area (gas:electrode:liquid) which enhances the current producing efficiency of the electrodes. The molecular weight range of usable polyethylenes is greater than 10,000. Since the behavior of the polyethylene under these conditions is much like a wax, a variety of waxes both synthetic and natural, such as polypropylene and polychlorofluoroethylene, are usable, as long as their softening points are at least about 10° C. above the operating temperature of the fuel cell and their molecular weights are in excess of 10,000. In general, the softening point should be above about 75° C. since few cells operate at temperatures below about 65° C. all the time.

Although the "solvent quench" method is preferred in the practice of the subject invention, the same is not limited to it. Satisfactory results can be obtained by subjecting the electrodes, which have been dipped into a hot solution of the electrolyte-repellent material, to rapid cooling by other suitable means. These include such techniques as rapid cooling in cold air, in liquid nitrogen, in Dry Ice, etc. Merely letting the treated electrodes cool at room temperature is suitable under some conditions.

As a specific example of the subject invention, a fuel cell cathode and a fuel cell anode were prepared in the following way. To form the anode, a sheet of porous nickel battery plaque (0.03 inch thick) was cut into small portions 3 centimeters square in area and then coated by a suitable technique with a slightly alkaline solution of rhodium and palladium chlorides along with a reducing agent. The solution was alkalized to a pH of 9 by the addition of ammonia. The treated plaque was heated in air to 225° C. for 15 minutes. This operation produced the catalyst, which consisted of 80 weight percent rhodium and 20 percent palladium, in a finely divided form and in a total concentration of 5 milligrams per square centimeter of apparent electrode area.

The cathode was made in the same way, except that a solution to which has been added equal amounts of silver acetate and nickel formate together with a reducing agent dissolved in concentrated ammonia was applied to the plaque. The plaque was then heated at 250° C. for 15 minutes. This operation resulted in a 50:50 mixed silver-nickel catalyst in a concentration of about 5 milligram per square centimeter of apparent electrode area.

Both electrodes were then given an electrolyte-repellency treatment in the same manner by dipping them into a solution of 6 grams of polyethylene (20,000 molecular weight) per 100 cc. of toluene at a temperature of 90° C. They were then rapidly removed and quenched in a bath of petroleum ether (B.P. 30°–60° C.) which was reasonably large enough in volume to quickly cool the electrodes. They were then vacuum dried at room temperature to remove all traces of solvent.

A fuel cell was assembled from the electrodes prepared as described above and run at a temperature of 70° C. using 15 M KOH electrolyte. Hydrogen and oxygen were used as the fuel gases. This cell gave the following performance:

| Current Density, ma./cm.$^2$ | Anode Voltage [1] | Cathode Voltage [1] | $H_2$–$O_2$ Cell Voltage |
|---|---|---|---|
| 0 | +0.46 | +1.62 | 1.16 |
| 10 | +0.465 | +1.48 | 1.01 |
| 25 | +0.48 | +1.44 | 0.96 |
| 50 | +0.51 | +1.40 | 0.89 |
| 100 | +0.54 | +1.32 | 0.78 |

[1] Vs. Zn reference electrode.

All voltages in the preceding table are resistance-free readings.

Porous nickel electrodes made from the same base stock but not given the special treatments of the subject invention are completely inoperative at the lower temperatures.

As used herein and in the appended claims, the term "apparent electrode area" signifies the geometric area of of the electrode. This area contrasts with the actual surface area of an activated surface which may be hundreds of times as large as the apparent or geometric area measured by conventional means.

What is claimed is:

1. A method for the production of a fuel cell electrode, which method comprises providing a gas permeable body suitably active with respect to fuel cell reactions, immersing said body in a hot solution of an electrolyte-repellent material having a molecular weight in excess of 10,000, said solution having a temperature sufficiently high to dissolve said electrolyte-repellent material, rapidly chilling said body in another liquid at a temperature at which said material is substantially insoluble, and drying the cooled body to remove liquid therefrom.

2. The method defined in claim 1 wherein said electrolyte-repellent material is selected from the group consisting of the polyethylenes, the polypropylenes, and the polychlorofluoroethylenes.

3. A method for the production of a fuel cell electrode, which method comprises depositing an active catalyst in and on a porous nickel electrode, immersing the catalyzed electrode in a hot solution of an electrolyte-repellent material selected from the group consisting of the polyethylenes, the polypropylenes and the polychlorofluoroethylenes having a molecular weight in excess of 10,000, said solution having a temperature sufficiently high to dissolve said electrolyte-repellent material, rapidly chilling the electrode in another liquid at a temperature at which said material is substantially insoluble, and drying the cooled electrode to remove liquid therefrom.

4. A method for the production of fuel cell electrodes which comprises: providing a gas-permeable nickel body suitably active with respect to fuel cell reactions; immersing said body in a toluene solution of polyethylene at a temperature above about 80° C. and sufficiently high to dissolve said polyethylene, said polyethylene having a molecular weight in excess of 10,000; rapidly cooling said body by immersion in petroleum ether at a temperature below about 50° C., said polyethylene being substantially insoluble in said petroleum ether; and thereafter drying said cooled body to remove any liquid therefrom.

References Cited by the Examiner

UNITED STATES PATENTS

| 2,860,175 | 11/1958 | Justi | 136—86 |
| 2,938,064 | 5/1960 | Kordesch | 136—122 |
| 3,080,440 | 3/1963 | Ruetschi et al. | 136—86 |
| 3,097,974 | 7/1963 | McEvoy et al. | 136—120 |
| 3,098,762 | 7/1963 | Roblee et al. | 136—120 |
| 3,098,772 | 7/1963 | Taschek | 136—120 |
| 3,113,048 | 12/1963 | Thompson | 136—86 |

FOREIGN PATENTS

| 233,847 | 3/1960 | Australia. |

JOHN H. MACK, *Primary Examiner.*